United States Patent Office 3,322,766
Patented May 30, 1967

---

3,322,766
3 - β - (4 - PYRIDYL)ETHYL - 2,3 - DIHYDRO - 4(1H)-QUINAZOLINONES
Edgar S. Schipper, Clifton, N.J., assignor to Shulton, Inc., Clifton, N.J., a corporation of New Jersey
No Drawing. Filed Nov. 13, 1964, Ser. No. 411,098
2 Claims. (Cl. 260—256.4)

This invention relates to basically substituted 2,3-dihydro-4(1H)-quinazolinones and their non-toxic salts.

The basically substituted 2,3-dihydro-4(1H)-quinazolinones of this invention are new compounds having the following formula:

(1)
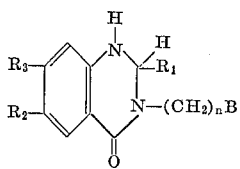

in which B is a di-lower alkylamino, 4-morpholino, 1-piperidyl, 1-pyrrolidinyl, pyridyl, such as 2-pyridyl or 4-pyridyl, 1-(4-X) piperazinyl in which X may be aryl and substituted aryl in which the substituent may be halogen and lower alkoxy; $n$ is a whole number from 0 to 4; $R_1$ may be halo-lower alkyl, aryl and substituted aryl in which the substituent may be one or more halogen, lower alkyl or lower alkoxy; and $R_2$ and $R_3$ may be hydrogen or halogen. Examples of lower alkyl or lower alkoxy are those containing less than 6 carbon atoms, such as methyl, ethyl for lower alkyl and methoxy for lower alkoxy. An example of aryl is phenyl, that of an aralkyl is homoveratryl, and that of a substituted aryl is tolyl, chlorophenyl, methoxyphenyl or polymethoxyphenyl.

The compounds of this invention manifest central nervous system depressant activity in mammals at dosages from 10 to 300 mg. per kg. of body weight. Such doses are significantly lower than the respective $LD_{50}$ of such compounds.

The basically substituted 2,3-dihydro-4(1H)-quinazolinones of this invention may be produced by reacting in the presence of a base, such as an alkali metal hydroxide, a carboxaldehyde with a substituted anthranilamide in accordance with the following reaction:

(2)
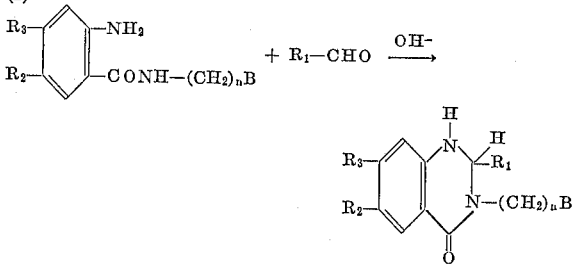

Non-toxic salts of the basically substituted 2,3-dihydro-4(1H)-quinazolinones of this invention are produced by mixing equimolecular amounts of the required basically substituted 2,3-dihydro-4(1H)-quinazolinone and the required acid in an inert solvent such as ether, ethanol, benzene or toluene, and subsequently filtering the precipitated salt or evaporating the solvent and recovering the salt residue. Salts of inorganic acids such as hydrochloric, sulfuric or phosphoric acid or salts of organic acids such as acetic, succinic, tartaric or ascorbic acid of the basically substituted 2,3-dihydro-4(1H)-quinazolinones may be produced in this manner.

A more comprehensive understanding of this invention is obtained by reference to the following examples:

Examples 1–16

2,3 - dihydro - 2 - (3,4 - dimethoxyphenyl) - 3 - (2-pyridyl)-4(1H)-quinazolinone;

2,3 - dihydro - 2 - (O-chlorophenyl) - 3 -(2 - pyridyl) methyl-6-chloro-4(1H)-quinazolinone;

2,3 - dihydro - 2 - phenyl - 3 - β - (4 - pyridyl)ethyl-4(1H)-quinazolinone;

2,3 - dihydro - 2 - (O - chlorophenyl) - 3 - β - (4-pyridyl)ethyl-6-chloro-4(1H)-quinazolinone;

2,3 - dihydro - 2 - (P - chlorophenyl) - 3 - β - (4-pyridyl)ethyl-6-chloro-4(1H)-quinazolinone;

2,3 - dihydro - 2 - (P - methoxyphenyl) - 3 - β - (4-pyridyl)ethyl-7-chloro-4(1H)-quinazolinone;

2,3 - dihydro - 2 - (3,4,5 - trimethoxyphenyl) - 3 - β-4-(pyridyl)ethyl-6-chloro-4(1H)-quinazolinone;

2,3 - dihydro - 2 - (3,4,5 - trimethoxyphenyl) - 3 - β-(4-morpholino)ethyl-6-chloro-4(1H)-quinazolinone;

2,3 - dihydro - 2 - P - methoxyphenyl - 3 - γ - diethylaminopropyl-4(1H)-quinazolinone;

2,3 - dihydro - 2 - P - chlorophenyl - 3 - β - dimethylaminoethyl-4(1H)-quinazolinone;

2,3 - dihydro - 2 - (3,4,5 - trimethoxyphenyl) -3 - β-dimethylaminoethyl-4(1H)-quinazolinone;

2,3-dihydro-2-P-methoxyphenyl-3-γ-[1-(4 - M - chlorophenyl)piperazinyl] propyl-4-(1H)-quinazolinone;

2,3-dihydro-2-O-chlorophenyl - 3 - β-(1-pyrrolidino)-ethyl-4-(1H)-quinazolinone;

2,3-dihydro-2-(3,4,5 - trimethoxyphenyl)-3-β-(1-piperidino)ethyl-4-(1H)-quinazolinone;

2,3-dihydro-2-O-tolyl-3-β-(4 - pyridyl)ethyl-6-chloro-4 (1H)-quinazolinone; and 2,3-dihydro - 2 - P-chlorophenyl-3-γ-[1-(4-P-methoxyphenyl)piperazinyl] propyl-4-(1H)-quinazolinone.

Each of the above basically substituted 2,3-dihydro-4(1H)-quinazolinones are produced by refluxing for 2 hours a solution of 0.1M of an anthranilamide as denoted in the following Table I and 0.1M of the required carboxaldehyde, also specified in Table I, in 100 ml. of ethanol. A solution of 80 ml. of 80% sodium hydroxide was added and the mixture was heated on a steam bath for 5–30 minutes. The reaction product crystallized from the solution when it was placed in the refrigerator at 0° C. for 2–24 hours. The product was filtered off and recrystallized in the solvent as specified in Table II.

TABLE I

| Ex. | Basically Substituted 2,3-Dihydro-4(1H)-Quinazolinones Made | Anthranilamide Used | Aldehyde Used |
|---|---|---|---|
| 1 | 2,3-dihydro-2-(3,4-dimethoxyphenyl)-3-(2-pyridyl)-4(1H)-quinazolinone. | 2-amino-N-2-pyridylbenzamide. | 3,4-dimethoxybenzaldehyde. |
| 2 | 2,3-dihydro-2-(o-chlorophenyl)-3-(2-pyridyl)methyl-6-chloro-4(1H)-quinazolinone. | 2-amino-5-chloro-N-(2-pyridyl)methylbenzamide. | Orthochlorobenzaldehyde. |
| 3 | 2,3-dihydro-2-phenyl-3-β-(4-pyridyl)ethyl-4(1H)-quinazolinone. | 2-amino-N-β-4-pyridylethylbenzamide. | Benzaldehyde. |
| 4 | 2,3-dihydro-2-(o-chlorophenyl)-3-β-(4-pyridyl)ethyl-6-chloro-4(1H)-quinazolinone. | 2-amino-5-chloro-N-β-4-pyridylethylbenzamide. | Orthochlorobenzaldehyde. |
| 5 | 2,3-dihydro-2-(p-chlorophenyl)-3-β-(4-pyridyl)ethyl-6-chloro-4(1H)-quinazolinone. | ----do---- | Parachlorobenzaldehyde. |
| 6 | 2,3-dihydro-2-(p-methoxyphenyl)-3-β-(4-pyridyl)ethyl-7-chloro-4(1H)-quinazolinone. | 2-amino-4-chloro-N-β-4-pyridylethylbenzamide. | Paraanisaldehyde. |
| 7 | 2,3-dihydro-2-(3,4,5-trimethoxyphenyl)-3-β-(4-(pyridyl)ethyl-6-chloro-4(1H)-quinazolinone. | 2-amino-5-chloro-N-β-4-pyridyl-ethylbenzamide. | 3,4,5-trimethoxybenzaldehyde. |
| 8 | 2,3-dihydro-2-(3,4,5-trimethoxyphenyl)-3-β-(4-morpholino)ethyl-6-chloro-4(1H)-quinazolinone. | 2-amino-5-chloro-N-β-4-morpholinoethylbenzamide. | Do. |
| 9 | 2,3-dihydro-2-p-methoxyphenyl-3-γ-diethylaminopropyl-4(1H)-quinazolinone. | 2-amino-3-N-γ-diethylaminopropylbenzamide. | Paraanisaldehyde. |
| 10 | 2,3-dihydro-2-p-chlorophenyl-3-β-dimethylaminoethyl-4(1H)-quinazolinone. | 2-amino-3-N-β-dimethylaminoethylbenzamide. | Parachlorobenzaldehyde. |
| 11 | 2,3-dihydro-2-(3,4,5-trimethoxyphenyl)-3-β-dimethylaminoethyl-4(1H)-quinazolinone. | 2-amino-3-N-β-dimethylaminoethylbenzamide. | 3,4,5-trimethoxy benzaldehyde. |
| 12 | 2,3-dihydro-2-p-methoxyphenyl-3-γ-[1-(4-m-chlorophenyl)piperazinyl] propyl-4(1H)-quinazolinone. | 1-m-chlorophenyl-4-γ-anthraniloylaminopropylpiperazine. | Paraanisaldehyde. |
| 13 | 2,3-dihydro-2-o-chlorophenyl-3-β-(1-pyrrolidino)-ethyl-4(1H)-quinazolinone. | 2-amino-3-N-β-1-pyrrolidinoethylbenzamide. | Orthochlorobenzaldehyde. |
| 14 | 2,3-dihydro-2-(3,4,5-trimethoxyphenyl)-3-β-(1-piperidino)ethyl-4(1H)-quinazolinone. | 2-amino-3-N-β-1-piperidinoethylbenzamide. | 3,4,5-trimethoxy benzaldehyde. |
| 15 | 2,3-dihydro-2-o-tolyl-3-β-(4-pyridyl) ethyl-6-chloro-4(1H)-quinazolinone. | 2-amino-5-chloro-3-N-β-4-pyridylethylbenzamide. | Orthotolualdehyde. |
| 16 | 2,3-dihydro-2-p-chlorophenyl-3-γ-[1-(4-P-methoxyphenyl)piperazinyl] propyl-4(1H)-quinazolinone. | 1-p-methoxyphenyl-4-γ-anthraniloylaminopropylpiperazine. | Parachlorobenzaldehyde. |

The following Table II shows the solvent which was used in the recrystallization of the basically substituted 2,3-dihydro-4-(1H)-quinazolinone of each of the examples and the melting point, analysis of carbon, hydrogen and nitrogen, as calculated and found, and yield of each of the basically substituted 2,3-dihydro-4(1H)-quinazolinones produced by the practice of each of the examples.

chloromethyl-3-β-(4-pyridyl)-ethyl-6-chloro-4(1H)-quinazolinone which was recrystallized in ethyl acetate had a melting point of 192–193° C. and was obtained in a yield of 81%. Analysis indicated 47.64% carbon, 3.25% hydrogen and 10.45% nitrogen, as contrasted with theoretical values of 47.63% carbon, 3.23% hydrogen and 10.37% nitrogen.

TABLE II

| Example | Solvent used in Recrystallization | M.P.,° C. | Calculated | | | Found | | | Yield (percent) |
|---|---|---|---|---|---|---|---|---|---|
| | | | C | H | N | C | H | N | |
| 1 | Ethyl acetate | 179–180 | 69.79 | 5.30 | 11.63 | 70.10 | 5.49 | 11.40 | 68 |
| 2 | ----do---- | 156–157 | 62.51 | 3.93 | 10.94 | 62.22 | 4.02 | 10.68 | 89 |
| 3 | ----do---- | 167–168 | 76.57 | 5.81 | 12.76 | 76.53 | 5.97 | 12.61 | 71 |
| 4 | ----do---- | 160–161 | 63.18 | 4.29 | 10.53 | 63.48 | 4.34 | 10.73 | 80 |
| 5 | ----do---- | 187–188 | 63.18 | 4.29 | 10.53 | 63.32 | 4.31 | 10.70 | 62 |
| 6 | ----do---- | 151–153 | 67.08 | 5.12 | 10.67 | 67.05 | 4.97 | 10.91 | 75 |
| 7 | Methanol | 183–184 | 63.50 | 5.33 | 9.27 | 63.51 | 5.13 | 9.10 | 75 |
| 8 | Ethyl acetate/hexane | 173–174 | 59.80 | 6.11 | 9.10 | 59.71 | 6.28 | 8.93 | 88 |
| 9 | Ethyl acetate | 125–126 | 71.90 | 7.95 | 11.43 | 71.77 | 7.80 | 11.29 | 100 |
| 10 | ----do---- | 171–173 | 65.54 | 6.11 | 12.74 | 65.53 | 6.31 | 13.06 | 62 |
| 11 | ----do---- | 148–149 | 65.43 | 7.06 | 10.90 | 65.11 | 7.08 | 10.64 | 43 |
| 12 | ----do---- | 75–76 | 68.50 | 6.36 | 11.41 | 68.19 | 6.59 | 11.48 | 55 |
| 13 | ----do---- | 159–162 | 67.50 | 6.23 | 11.80 | 67.36 | 6.11 | 11.81 | 93 |
| 14 | Ethanol | 109–110 | 67.74 | 7.34 | 9.80 | 67.98 | 7.35 | 9.60 | 85 |
| 15 | Ethyl acetate/hexane | 148–149 | 69.93 | 5.34 | 11.12 | 70.64 | 5.60 | 11.14 | 64 |
| 16 | Ethyl acetate | 147–148 | 68.49 | 6.36 | 11.41 | 68.42 | 6.19 | 11.62 | ,0 |

*Example 17*

2,3-dihydro-2-trichloromethyl-3-β-(4 - pyridyl)-ethyl-6-chloro-4(1H)-quinazolinone.

A solution of 27.6 g. (0.1M) of 2-amino-5-chloro-N-β-(4-pyridyl)ethylbenzamide in 750 ml. of absolute ethanol was saturated with gaseous hydrogen chloride. After addition of 2.5 liters of dry ether, the precipitated dihydrochloride was filtered off and dried. It was dissolved in 200 ml. of chloral and the solution was stirred and heated at 60–70° C. for 3 hours. The excess chloral was evaporated under reduced pressure and the residue was poured into 1 liter of concentrated ammonium hydroxide. The slurry was stirred 16 hours and the solid was filtered off and recrystallized. The resulting 2,3-dihydro-2-tri-

What is claimed is:
1. A compound selected from the class consisting of basically substituted 2,3-dihydro-4(1H)-quinazolinones and pharmaceutically acceptable acid addition salts thereof, said basically substituted 2,3-dihydro-4(1H)-quinazolinones having the formula:

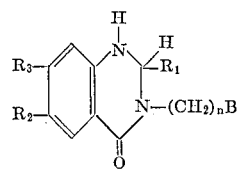

in which B is pyridyl, $n$ is 2; $R_1$ is selected from the class consisting of halo-lower alkyl, phenyl and substituted phenyl containing at least one substituent selected from the class consisting of halogen, lower alkyl and lower alkoxy; and $R_2$ and $R_3$ are selected from the class consisting of hydrogen and halogen.

2. 2,3-dihydro-2-phenyl-3-β-(4 - pyridyl)ethyl-4(1H)-quinazolinone.

References Cited
UNITED STATES PATENTS

| 3,162,636 | 12/1964 | Gurien | 260—251 |
| 3,215,697 | 11/1965 | Hauptmann et al. | 260—254.4 |
| 3,257,397 | 6/1966 | Bolger | 260—247.2 |

ALEX MAZEL, *Primary Examiner.*

HENRY R. JILES, *Examiner.*

JOSEPH A. NARCAVAGE, *Assistant Examiner.*